United States Patent
Seo et al.

(10) Patent No.: US 10,411,541 B2
(45) Date of Patent: Sep. 10, 2019

(54) DRIVING MOTOR FOR ENVIRONMENTALLY FRIENDLY VEHICLES

(71) Applicants: Hyundai Motor Company, Seoul (KR); Kia Motors Corporation, Seoul (KR)

(72) Inventors: Young Jin Seo, Yongin-si (KR); Dae Woong Han, Anyang-si (KR); Hee Ra Lee, Anyang-si (KR); Yeon Ho Kim, Suwon-si (KR); Jae Won Ha, Osan-si (KR); Myung Kyu Jeong, Hwaseong-si (KR); Jae Woo Shim, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 246 days.

(21) Appl. No.: 15/378,181

(22) Filed: Dec. 14, 2016

(65) Prior Publication Data
US 2017/0310180 A1    Oct. 26, 2017

(30) Foreign Application Priority Data
Apr. 20, 2016    (KR) .................. 10-2016-0048002

(51) Int. Cl.
H02K 3/28    (2006.01)
H01F 5/04    (2006.01)
H02K 3/52    (2006.01)

(52) U.S. Cl.
CPC ............. *H02K 3/28* (2013.01); *H01F 5/04* (2013.01); *H02K 3/522* (2013.01); *H02K 2203/06* (2013.01); *H02K 2203/12* (2013.01); *Y02T 10/7258* (2013.01)

(58) Field of Classification Search
CPC ...... H02K 3/28; H02K 3/522; H02K 2203/06; H02K 2203/12; H01F 5/04; Y02T 10/7258
USPC .......................................................... 310/71
See application file for complete search history.

(56) References Cited

U.S. PATENT DOCUMENTS

| 6,177,751 | B1 * | 1/2001 | Suzuki | H02K 1/148 310/194 |
| 6,968,237 | B2 * | 11/2005 | Doan | A61N 1/056 607/122 |
| 2008/0290979 | A1 * | 11/2008 | Suzuki | H01F 5/02 336/192 |
| 2011/0215662 | A1 * | 9/2011 | Lee | H02K 3/38 310/71 |

(Continued)

FOREIGN PATENT DOCUMENTS

| EP | 2731237 A | 5/2014 |
| EP | 2947754 A | 11/2015 |

(Continued)

*Primary Examiner* — Nguyen Tran
*Assistant Examiner* — Htet Z Kyaw
(74) *Attorney, Agent, or Firm* — Brinks Gilson & Lione

(57) ABSTRACT

The present disclosure relates to a driving motor for environmentally friendly vehicles. The driving motor for the vehicles includes: a stator core; a bobbin assembled to the stator core; a coil part wound on the bobbin; a coil lead-out portion configured such that an end portion of the coil part drawn from the bobbin is formed to have a curved structure; and a terminal bonded with a bonding portion formed in the coil lead-out portion.

7 Claims, 6 Drawing Sheets

(56) References Cited

U.S. PATENT DOCUMENTS

| | | | | |
|---|---|---|---|---|
| 2013/0313922 | A1* | 11/2013 | Kim | H02K 1/12 |
| | | | | 310/44 |
| 2014/0125169 | A1* | 5/2014 | Jang | H02K 5/225 |
| | | | | 310/71 |
| 2016/0012964 | A1* | 1/2016 | Kim | H01F 27/325 |
| | | | | 336/192 |
| 2016/0020659 | A1* | 1/2016 | Takahashi | H02K 1/146 |
| | | | | 417/410.4 |

FOREIGN PATENT DOCUMENTS

| | | |
|---|---|---|
| JP | H06-86302 U | 12/1994 |
| KR | 10-2010-0078660 A | 7/2010 |
| KR | 10-2013-0012719 A | 2/2013 |
| KR | 10-2013-0028565 A | 3/2013 |
| KR | 10-2013-0028566 A | 3/2013 |
| KR | 10-2015-0078660 A | 7/2015 |

* cited by examiner

S-SHAPE

DRIVING MOTOR FOR ENVIRONMENTALLY FRIENDLY VEHICLES

CROSS-REFERENCE TO RELATED APPLICATION

This application claims priority to and the benefit of Korean Patent Application No. 10-2016-0048002, filed on Apr. 20, 2016, the entire contents of which are incorporated herein by reference.

FIELD

The present disclosure relates to a driving motor for environmentally friendly vehicles.

BACKGROUND

The statements in this section merely provide background information related to the present disclosure and may not constitute prior art.

In general, since a driving motor applied to environmentally friendly vehicles functions to generate power for driving vehicles, it is called a power electronic part, and is positioned between an engine and a transmission and mounted to the chassis of the vehicle.

Therefore, the driving motor is always exposed to vibration due to the operation of the engine and vibration transmitted from a road surface. If a coil part of the driving motor, which functions to generate electromagnetic force using electric current applied thereto, is damaged (becomes disconnected) due to external vibration, the driving motor does not work.

To solve this problem, a concentrated winding structure, which can improve the degree of integration in a given space (winding space factor), is applied to the driving motor.

Such a concentrated winding-type driving motor includes a plurality of divisional cores, a coil part drawn from each of the divisional cores, and a terminal (bus bar) to which the drawn coil part is bonded using fusing, welding or the like. However, we have discovered that, because it is difficult to build a structure capable of additionally supporting a coil interposed between the coil winding portion of the divisional core and the fusing portion of the terminal, the driving motor is vulnerable to external vibration.

The above information disclosed in this Background section is only for enhancement of understanding of the background of the present disclosure and therefore it may contain information that does not form the prior art that is already known to a person of ordinary skill in the art.

SUMMARY

The present disclosure provides a driving motor for environmentally friendly vehicles, in which a coil lead-out portion, drawn from a divisional core and extending to a terminal, has a curved structure having a "C" shape, an "S" shape, an "α" shape or the like, thereby improving vibration resistance and effectively inhibiting or preventing disconnection of the coil lead-out portion due to external vibration.

In one aspect, the present disclosure provides a driving motor for environmentally friendly vehicles. The driving motor having a stator core, and a bobbin assembled to the stator core, further includes: a coil part wound on the bobbin; a coil lead-out portion configured such that an end portion of the coil part drawn from the bobbin is formed to have a curved structure; and a terminal bonded with a bonding portion formed in the coil lead-out portion.

In one form, the coil lead-out portion may include a plurality of bent portions, each having an angle of about 90 degrees or less.

In another form, the coil lead-out portion may be formed to have at least one of a "C" shape, an "S" shape or an "α" shape.

In still another form, the coil lead-out portion may be fitted into a guide recess formed in the bobbin so as to be fixed at a predetermined drawing position.

In yet another form, after being fitted into the guide recess, the coil lead-out portion may be formed to have a curved structure by moving a pair of guide pins arranged to face each other.

In still yet another form, a number and a position of the guide pins may be set to form a desired curved structure of the coil lead-out portion.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
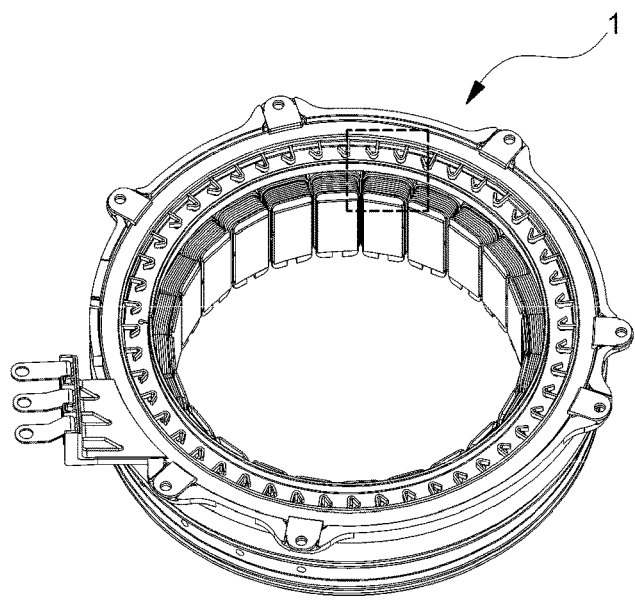
FIG. 1 is a view schematically illustrating a driving motor for environmentally friendly vehicles according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particular intended application and use environment.

While the present disclosure will be described in conjunction with exemplary forms, it will be understood that present description is not intended to limit the present disclosure to those exemplary forms. On the contrary, the present disclosure is intended to cover not only the exemplary forms, but also various alternatives, modifications, equivalents and other forms, which may be included within the spirit and scope of the present disclosure as defined by the appended claims.

Figure 2:
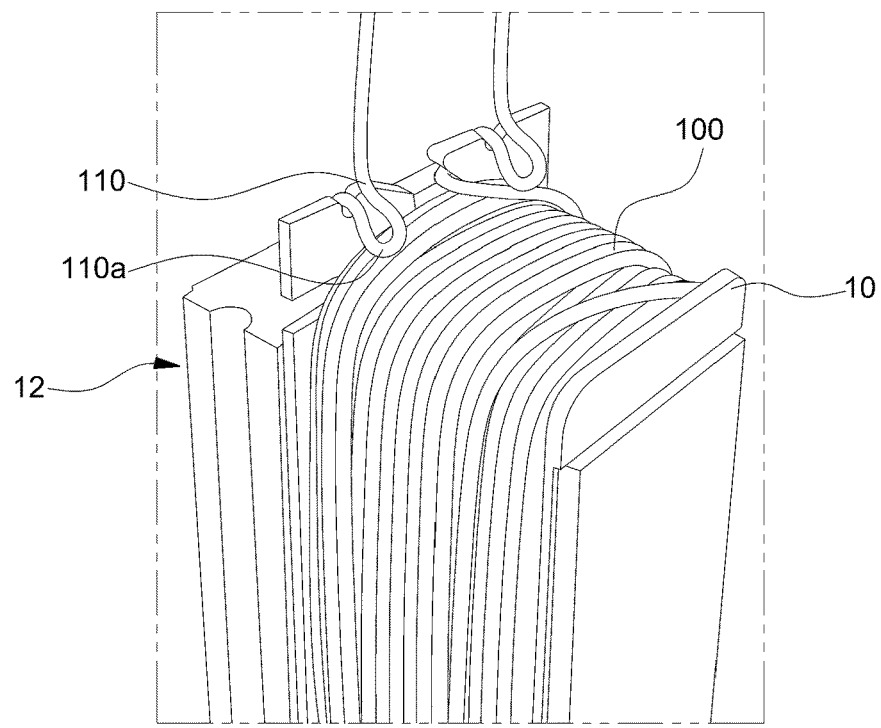
FIG. 2 is a view illustrating a coil lead-out portion of a driving motor for environmentally friendly vehicles according to one form of the present disclosure.
Figure 3:
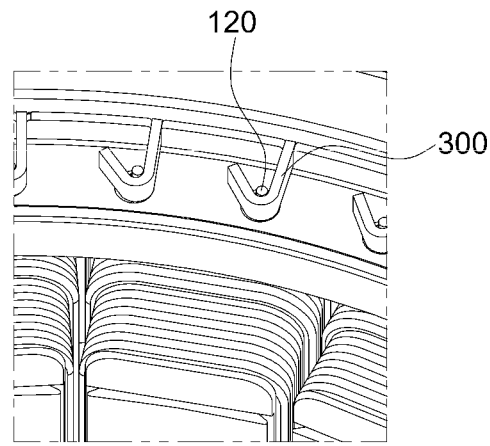
FIG. 3 is an enlarged view of the box shown in dotted line in FIG. 1 to illustrate a bond state of a bonding portion of the driving motor for environmentally friendly vehicles according to one form of the present disclosure.

As shown in FIGS. 1 to 3, the present disclosure relates to a driving motor 1 for environmentally friendly vehicles having a stator core 12 and a bobbin 10, which is formed as an insulating component to be assembled with the stator core 12. The driving motor 1 includes a coil part 100 wound on the stator core 12, a coil lead-out portion 110, and a terminal 300.

Typically, a driving motor 1 of a concentrated winding type, especially a divisional core type, is structured such that the coil part 100 is wound on the stator core 12 and such that the coil lead-out portion 110, which is formed as an end portion of the coil part 100, is drawn straight, is assembled with the terminal 300, and forms an electrical path using a bonding method (fusing, welding, compression, etc.).

When the drawn coil lead-out portion 110 is connected to the terminal 300, the coil lead-out portion 110 is drawn straight from the bobbin 10, which may cause disconnection of the coil lead-out portion 110 due to external vibration.

Figure 4:
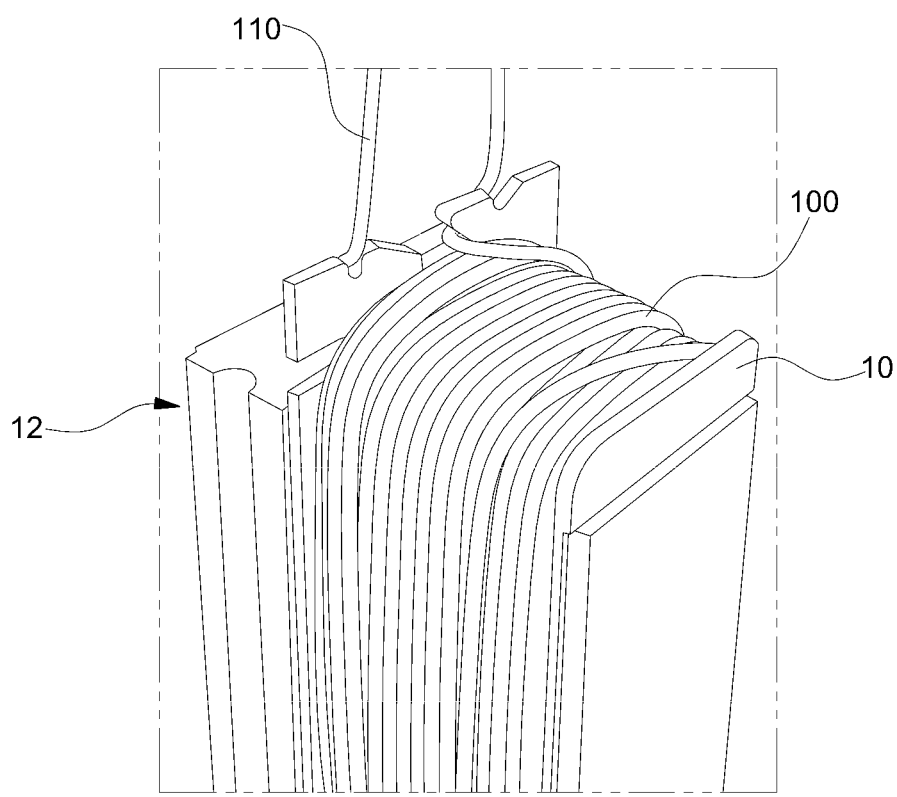
FIG. 4 is a view illustrating a coil lead-out portion of a conventional driving motor for environmentally friendly vehicles.

In other words, as shown in FIG. 4, since the coil lead-out portion 110 drawn from the bobbin 10 extends straight to be connected to the terminal 300, if external vibration occurs in the X-axis direction in the state in which both ends of the coil lead-out portion 110 are fixed, the coil lead-out portion 110 may be repeatedly bent and stretched, and subsequent disconnection of the coil lead-out portion 110 may occur.

Accordingly, in one form, the coil lead-out portion 110 is formed to have a curved structure so as to increase the vibration resistance of the coil lead-out portion 110.

In detail, the coil lead-out portion 110 is formed to have a plurality of bent portions 110a, each having an angle of about 90 degrees or less. Accordingly, the coil lead-out portion 110 may have a curved structure having various shapes.

Figure 5A:
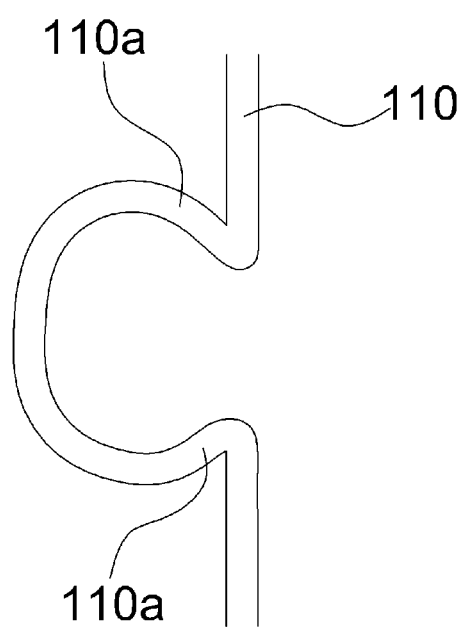
FIGS. 5A-5C are a view illustrating a coil lead-out portion having various shapes in the driving motor for environmentally friendly vehicles according to one form of the present disclosure.
Figure 5B:
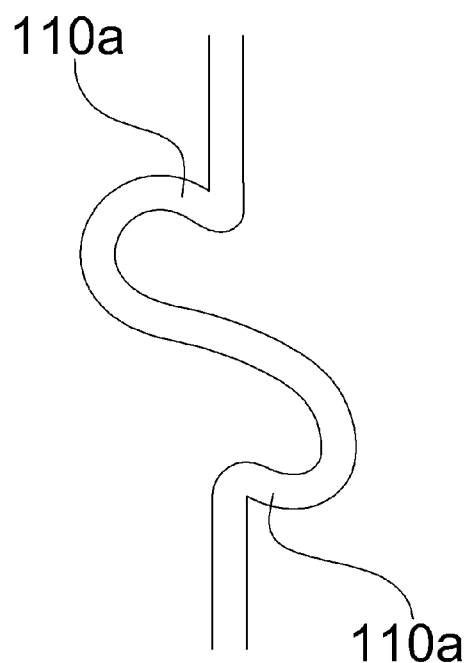
Figure 5C:
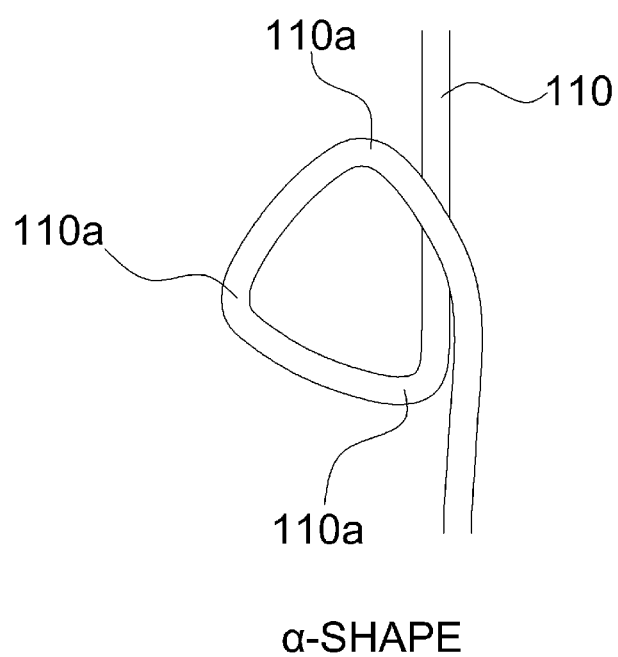

In one form, the coil lead-out portion 110, as shown in FIGS. 5A-5C, may be formed to have any one of the shapes "C", "S" and "α".

After the winding of the coil part 100, by forming the coil lead-out portion 110 to have a curved structure having any one of the shapes "C", "S" and "α" and by mechanically assembling and fixing the coil lead-out portion 110 to the terminal 300, the curved structure of the coil lead-out portion 110 can serve as a damper against external vibration. Therefore, even when external vibration occurs frequently, stress on the bonding portion 120 of the terminal 300 and the coil lead-out portion 110 may be dispersed, and consequently the possibility of fatigue fracture of the coil lead-out portion 110 may be remarkably reduced.

As a result, the vibration resistance feature of the coil lead-out portion 110 can be improved by virtue of the above-described curved structure, and disconnection of the coil lead-out portion 110 attributable to external vibration can be inhibited or prevented, thereby avoiding deterioration in operational efficiency and fuel efficiency, which may be caused by an increase in resistance of the driving motor attributable to disconnection of the coil lead-out portion 110.

Because the coil lead-out portion 110 according to the present disclosure has a curved structure instead of a conventional straight structure, the length of the coil lead-out portion 110 drawn from the bobbin 10 should be larger than the drawn length of the coil lead-out portion in the prior art. In the case of the "C"-shaped curved structure, the length of the coil lead-out portion 110 drawn from the bobbin 10 is set to be at least about 1.2 times as large as the drawn length in the prior art.

Hereafter, the process of forming the curved structure of the coil lead-out portion 110 will be explained.

First, the bobbin 10 is assembled to the stator core 12.

Next, the coil part 100 is wound on the bobbin 10, and the coil lead-out portion 110 drawn from the bobbin 10 is formed to have a curved structure using guide pins 200.

The coil lead-out portion 110 is bonded to the terminal 300 using fusing, welding, compression or some other method. Since this bonding process is the same as the commonly known bonding process, a detailed explanation thereof will be omitted herein.

Figure 6:
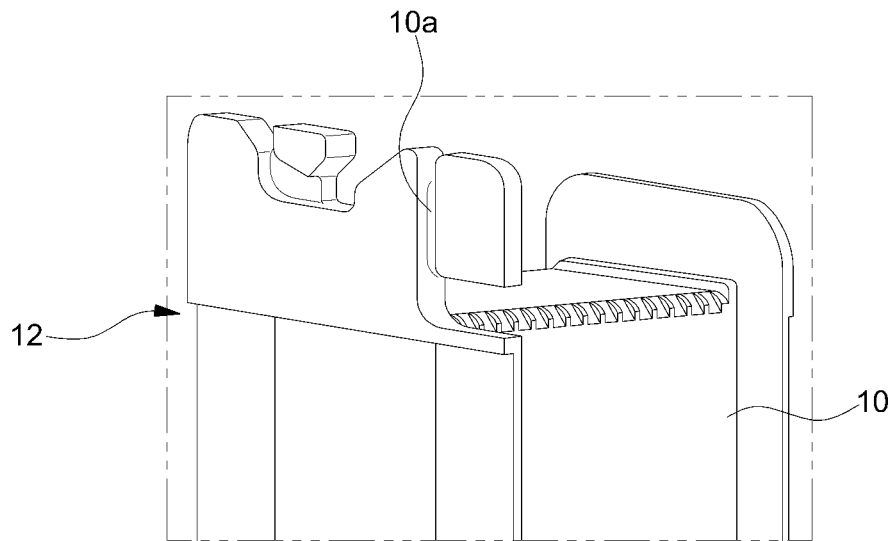
FIG. 6 is a view schematically illustrating a bobbin of the driving motor for environmentally friendly vehicles according to one form of the present disclosure.

A portion of the coil lead-out portion 110 is fitted into a guide recess 10a formed in the bobbin 10 so as to be fixed at a predetermined drawing position, and the coil lead-out portion 110 is formed to have various curved structures using movement of the guide pins 200 as illustrated in FIG. 6.

Figure 7:
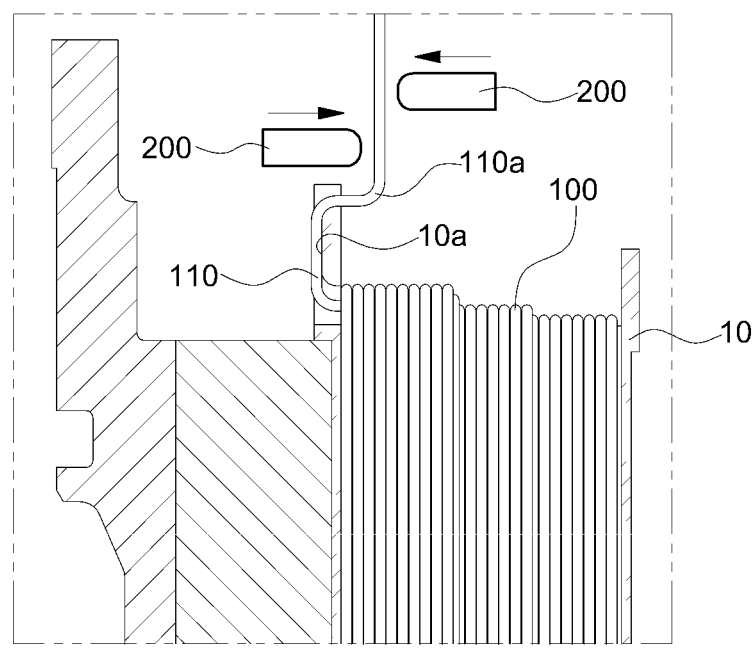
FIG. 7 is a view schematically illustrating a process of forming the coil lead-out portion of the driving motor for environmentally friendly vehicles according to one form of the present disclosure.

As an example, when it is intended to form the coil lead-out portion 110 to have an "S" shape, among the curved structures illustrated in FIGS. 5A-5C, a portion of the coil lead-out portion 110 is fitted into the guide recess 10a so as to be fixed at a predetermined drawing position, and, as shown in FIG. 7, is then formed to have a plurality of bent portions 110a by moving a pair of guide pins 200 that face each other.

The guide pins 200 are arranged to face each other and pressurize the coil lead-out portion 110 at different positions, so that the coil lead-out portion 110 has the above-described curved structure.

The guide pins 200 may be set to have a structure for forming the coil lead-out portion 110 in a curved shape. For example, the number, position, length, etc. of the guide pins 200 may be variously set so as to satisfy the desired curved structure of the coil lead-out portion 110.

As is apparent from the above description, the present disclosure provides a driving motor for environmentally friendly vehicles, in which a coil lead-out portion drawn from a divisional core and extending to a terminal has a curved structure having a "C" shape, an "S" shape, an "α" shape or the like, thereby improving vibration resistance and inhibiting or preventing disconnection of the coil lead-out portion due to external vibration.

As a result, the present disclosure has an effect of inhibiting or preventing deterioration in operational efficiency and fuel efficiency, which may be caused by an increase in resistance of the driving motor attributable to disconnection of the coil lead-out portion.

The present disclosure has been described in detail with reference to forms thereof. However, it will be appreciated by those skilled in the art that changes may be made in these forms without departing from the principles and spirit of the present disclosure.

What is claimed is:

1. A driving motor for environmentally friendly vehicles having a stator core and a bobbin assembled to the stator core, the driving motor comprising:
 a coil part wound on the bobbin;
 a coil lead-out portion forming an end portion of the coil part and including a fitting portion, a bonding portion, and a middle portion having a curved structure; and
 a terminal bonded with the bonding portion of the coil lead-out portion,
 wherein the fitting portion is directly extended from the coil part, and the middle portion is continuously extended from the fitting portion and arranged between the bobbin and the terminal, and
 wherein the middle portion is bent freely to form the curved structure.

2. The driving motor of claim 1, wherein the middle portion of the coil lead-out portion includes a plurality of bent portions, each having an angle of about 90 degrees or less.

3. The driving motor of claim 2, wherein the middle portion of the coil lead-out portion is formed to have at least one of a "C" shape, an "S" shape or an "a" shape.

4. The driving motor of claim 1, wherein the fitting portion of the coil lead-out portion is fitted into a guide recess formed in the bobbin so as to be fixed to the bobbin.

5. The driving motor of claim 4, wherein the curved structure of the middle portion of the coil lead-out portion is formed by a pair of guide pins arranged to face each other.

6. The driving motor of claim 5, wherein the curved structure of the middle portion is configured to depend on a number and a position of the guide pins.

7. A driving motor for environmentally friendly vehicles having a stator core and a bobbin assembled to the stator core, the driving motor comprising:
 a coil part wound on the bobbin;
 a coil lead-out portion configured such that an end portion of the coil part drawn from the bobbin is formed to have a curved structure; and
 a terminal bonded with a bonding portion formed in the coil lead-out portion, wherein the coil lead-out portion is formed as the end portion of the coil part and extends from the bobbin to the terminal such that the coil lead-out portion having the curved structure is formed only between the bobbin and the terminal, and
 wherein a middle portion of the coil lead-out portion is bent freely to form the curved structure.

* * * * *